United States Patent
Schreiner et al.

[15] 3,642,523
[45] Feb. 15, 1972

[54] METHOD AND DEVICE FOR PRODUCING TIN LAYERS OF >3μ ON COPPER AND COPPER ALLOY WIRE BY HOT TIN PLATING

[72] Inventors: Horst Schreiner; Henryk Fidos, both of Nurnberg, Germany

[73] Assignee: Siemens Aktiengesellschaft, Berlin and Munich, Germany

[22] Filed: Apr. 25, 1968

[21] Appl. No.: 724,011

[30] Foreign Application Priority Data

Apr. 26, 1967 Germany .......................... S 109555

[52] U.S. Cl. .................. 117/114, 117/102 M, 117/102 L, 117/115, 117/128, 117/227, 117/231
[51] Int. Cl. ............................ B44d 1/42, C23c 1/04
[58] Field of Search .............. 117/128, 227, 231, 71 M, 114, 117/115, 102 M, 102 L, 604 C; 118/125

[56] References Cited

UNITED STATES PATENTS

| | | | |
|---|---|---|---|
| 1,558,035 | 10/1925 | Millring | 117/114 |
| 1,981,130 | 11/1934 | Underwood | 117/102 |
| 2,515,022 | 7/1950 | Snyder et al. | 117/128 X |
| 3,066,041 | 11/1962 | Busch | 117/114 X |
| 3,203,826 | 8/1965 | Stobievski | 117/115 |
| 3,391,450 | 7/1968 | Bauer | 117/128 |
| 3,499,418 | 3/1970 | Mayhew | 117/102 X |

*Primary Examiner*—Ralph S. Kendall
*Assistant Examiner*—Alan Grimaldi
*Attorney*—Curt M. Avery, Arthur E. Wilfond, Herbert L. Lerner and Daniel J. Tick

[57] ABSTRACT

The invention has an object the production of good solderability wires of copper and copper alloys, through a uniformly thick coating of pure tin or a tin alloy with Pb and/or Sb, Bi, Zn and Cd. This object is achieved by passing perpendicularly (or at a small angle to the vertical) copper or a copper alloy wire through a heated zone after passing a tin bath. This heated zone is within a heated gas chamber which is traversed by the wire with the wire at such a distance from the chamber wall that the oscillating wire is not contacted by the wall. In accordance with the present invention, a wire with 0.2 to 1 mm. and preferably 0.5 mm. diameter is led, after passing the tin bath, through a heating zone of a round or a square cross section, with a length of 30 to 100 cm. and a temperature of 200° to 430° C. Adhesion forces as well as surface tension forces are active in the development of a uniformly thick tin coating. The present invention also relates to a device used to perform the above method.

9 Claims, 4 Drawing Figures

METHOD AND DEVICE FOR PRODUCING TIN LAYERS OF >3μ ON COPPER AND COPPER ALLOY WIRE BY HOT TIN PLATING

Our invention relates to a method for producing tin layers of >3μ on copper and copper alloy wires, particularly copper jumper wires, by hot tin plating.

A minimum thickness of >3μ is necessary for obtaining excellent solder characteristics in tin-plated copper jump wires. This means that the wire has a tin layer of the same thickness over the entire surface. Generally, freshly tinned copper jump wires are perfectly solderable for a certain period of time. When the wire is first tinned, the solder period is on an average <1 second according to a standardized method (solder ball test). After prolonged storage, the soldering time increases from over 2 to 20 seconds. This solderability is insufficient for many purposes. Of particular interest is the solder condition of the wires after 4 days storage in air, at 155° C. If, following this storage, one still measures an average solder period of <1 second, the wire possesses excellent solder characteristics. These characteristics are sufficient for automatic solder processes, such as flood and dip soldering.

The solderability may be determined by means of the above-mentioned solder ball test. The test uses: 0.5 mm. wire diameter, solder ball SnPb 40 weighing 75 mg., a testing temperature 235° C. The wire is clamped and dipped into the liquid bead and the time is measured for the solder drop to cover the entire wire. The wire is examined at several places by rotating the wire about 180° along the longitudinal axis.

The quality of wire prepared in known manner has not yet met the above prerequisites of a homogeneous 3μ minimum thickness tin layer and adequate solder properties following storage as indicated. These poor properties constitute a disadvantage primarily in automatic rapid solder technique.

Our present invention has as an object the production of good solderability wires of copper and copper alloys, through a uniformly thick coating of pure tin or a tin alloy with Pb and/or Sb, Bi, Zn and Cd. This object is achieved by passing the copper or a copper alloy wire through a heated zone after passing a tin bath. This heated zone is within a heated gas chamber which is traversedly the wire with the wire at a distance from the chamber wall so that the oscillating wire is not contacted by the wall. In accordance with the present invention, a wire with 0.2 to 1 mm. and preferably 0.5 mm. diameter is led, after passing the tin bath, through a heating zone of a round or square cross section, with a length of 30 to 100 cm. and a temperature of 200° to 430° C. Adhesion forces as well as surface tension forces are active in the development of a uniformly thick tin coating. It is favorable to guide the wire, emerging from the tin bath perpendicularly (or at a small angle to the vertical) into the heating zone. The present invention also relates to a device used to perform the above method.

The copper wire upon leaving the tin bath drags along by adhesion an excess amount of tin which drips back as tin droplets along the wire irregularly into the melt. When the wire enters an air cooling zone, droplike irregularities begin to form on the tinned copper wire. Intensive tests have shown that the tin runoff along the wire may be measured in a defined way along length $l_w$ while the wire passes through the heating zone of the temperature $T_w$.

The method of the present invention makes it possible to obtain, without using a scraping nozzle or die, a perfect, hot thick tin plating of wires, especially of copper jump wires having a tin layer with a minimum thickness of 3μ. The conditions of the heated zone are determined by its temperature and its length, that is the temperature distribution along the length. The method of the present invention may also be used in two or more stages.

In a standard embodiment, the heated zone is filled with air. According to a preferred embodiment, an inert gas is introduced into said heated zone thus reducing the formation of an oxide layer upon the tin coating.

Hence, the present invention offers a relatively simple method and an appropriately simple device for hot tin plating of copper and copper alloy wires. The wire is provided, at a high speed of transit with a tin layer, within the desired thickness range of 3 to 15μm. and having practically a uniform thickness over the entire periphery of the wire. The expensive diamond or hard metal dies previously required as scraping dies or nozzles are thus eliminated. Since the present invention is conducted without such dies, no time-wasting threading is required for adjusting the wire, particularly if and when the wire tears. Finally, an increase in the output capacity is possible by increased velocity. Thus, for example, compared to the hot thick tin-plating method which operates with one or more scraping dies, the rate of travel may be increased by more than a factor of 2 until the takeoff tension in the installation comes close to the heat resistance of the copper wire.

Since the important variables may be easily adjusted, it is apparent that if a tin layer is produced on a similar wire employing the same factors, an almost analogous layer of tin will form on the respective wires. Thus, mass production becomes relatively simple. When several adjacent wires are involved one heating zone may be used for all wire passages.

Preferably, a first cooling zone should be between 20° and 50° C. and 100 to 300 cm. long, while the second heating zone should lie within 200° to 430° C., and between 30 to 100 cm. long. A second cooling zone may correspond in essence, to the first cooling zone, as to temperature and length and thus is 20° to 50° C. over a length of 100 to 300 cm.

The drawing shows devices for performing the method of the present invention, as well as a diagram. In the drawing.

Figure 1:
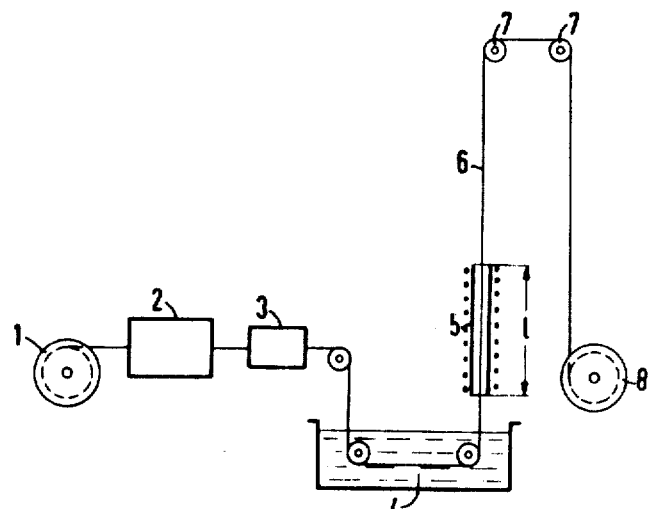
FIG. 1 shows schematically a tin plating installation.

In FIG. 1, a wire tin plating installation is schematically illustrated. A copper wire runs from coil 1, through steam-annealing device 2, etching bath 3, tin bath 4 and is passed directly through the heating zone 5. The tin plated wire passes through the adjacent cooling zone 6, which effects the cooling and the uniform solidification of the tin layer, and is wound upon takeup roll 8, usually via guide rollers 7. Roll 8 is driven and, within pulling forces $p_1$ to $p_2$ provides the wire with a speed V.

In the case of one wire, the temperature zone 5 is comprised of a heated pipe having a round or a square cross section with a length of 80 cm. and an interior diameter of 1.5 cm. When there are several parallel wires to be coated the heating zone is a box with rectangular cross section; e.g., for 12 parallel wires, the cross section is 40×2 cm.²

Figure 2:
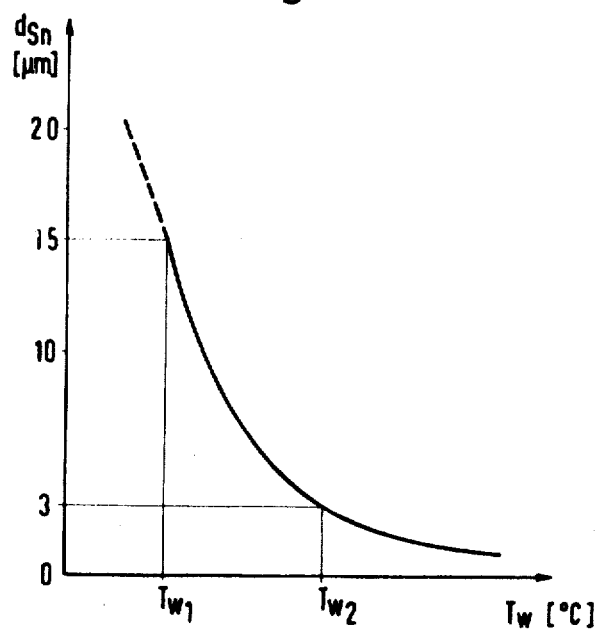
FIG. 2 is a graphic illustration.

FIG. 2 illustrates the present invention by a diagram which shows the interrelationship between the obtainable tin layer thickness $dS_n$, which is also uniform across the wire periphery, and the temperature $T_w$ of the heating zone. At low temperatures, we find larger fluctuations in the thickness of the tin layer, which is shown by dashes in FIG. 2. When the temperatures are too high, the thickness of the tin layer falls below 3μ. The operating range with respect to the temperature of the "keeping warm" or heated zone is between the limits of $T_{w_1}$ and $T_{w_2}$, at which according to FIG. 2, a layer thickness of 15μ and 3μ, ar respectively obtained.

Figure 3:
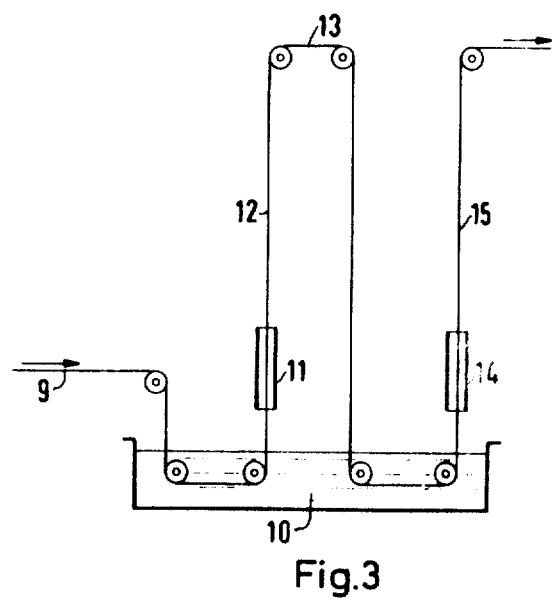
FIGS. 3 and 4 show schematically other tin plating installations.

FIG. 3 shows, schematically, another tin plating installation. A previously annealed and etched wire 9, having a clean metallic surface, such as seen in FIG. 1, passes sequentially through the bath 10 and the first heating zone 11 and the cooling zone 12. The already coated wire 13 reenters the bath 10 and, after emerging therefrom, enters the second heating zone 14. The twice-coated wire 15 is guided, as in FIG. 1, and wound upon a takeup roll. The temperature of the first heating zone 11 is higher than the temperature of the second heating zone 14. In this way, the wire is first coated thinly and, by passing through the bath a second time and the second heating zone 14 is coated with a second, thicker layer of pure tin or tin alloyed with Pb and/or Sb, Zn, and Cd.

According to a preferred embodiment of the method shown in FIG. 3, a die is used, instead of the first-heating zone 11, to obtain a first, thin cover layer of 1μ thickness. The total layer thickness of the two-layer coating is adjusted by the temperature of the heating zone 14, and is between 3μ and 15μ.

Figure 4:
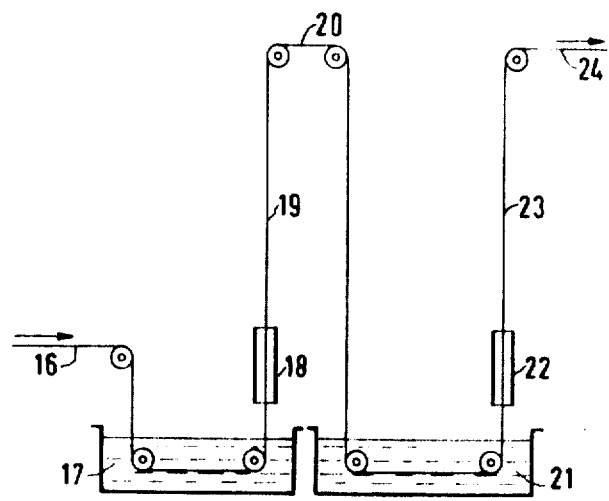

Another preferred embodiment of the present method is illustrated in FIG. 4. The annealed and scored wire 16 runs through the first bath 17 and thereafter through the first heating zone 18 and through the cooling zone 19. Wire 20 coated with a first metal or metal-alloy layer enters the second bath 21 and thereafter, passes through second heating zone 22, and the cooling zone 23. The wire 24 coated with two differently composed metal layers, is wound upon a roll as shown in FIG. 1. The first bath 17 is comprised of pure tin or tin alloyed with lead and/or Sb, Bi, Zn, Cd or a pure lead melt. The second bath 21 is comprised of a tin alloy with Pb and/or Sb, Bi, Zn, Cd. The melting temperature of the bath 21 is lower than that of the bath 17.

The hot thick tinned wires of the present invention, especially copper jump wires, are to be used primarily for raw wires whose diameter is mostly <1 mm. They can also be used for insulated wires. It is particularly advantageous to employ the thickly tinned wires in production purposes wherein automatic solder devices are used having soldering periods of about 1 second.

The present invention will now be explained in greater detail by means of the following examples:

EXAMPLE 1

A pure copper wire with a diameter of 0.5 mm. was guided through a tin bath of 270° C. bath temperature, led out perpendicularly from the bath and through a heated pipe, with a transit speed of 100 cm./sec. The heating length was between 20 and 50 cm. and a temperature $T_H$ of between 200° and 380° C. At a heating length of 50 cm. and a temperature $T_H$=340° C., a tin wire was obtained, with a highly uniform thick tin layer which was at least 3μ thick.

In cases where copper wires have a diameter of more or of less than 0.5 mm., the temperature of the heating zone is to be set at an optimum with respect to the desired layer thickness.

EXAMPLE 2

A copper wire with a diameter of 0.5 mm. passes at a velocity of 100 cm./sec. through the first bath of pure tin, which has a temperature of 270° C. The first heating zone has a length of 50 cm. and a temperature of 400° C. The wire, coated with pure tin, passes through the second bath, of SnPb 40 alloy, which has a temperature of 225° C. After leaving the second bath, the wire passes through the second heating zone whose length is 50 cm. and whose temperature is 300° C. The twice-coated wire shows in cross section an Sn layer which is 1 to 2μ thick and above it an approximately 5μ thick SbPb layer. After 4 days of storage in the air, at 155° C., this wire shows, following the solder ball test, an average solder time of <1 second and, hence, excellent solder characteristics.

EXAMPLE 3

In the installation shown in FIG. 4, a 0.5 mm. thick copper jump wire was provided with a two layer hot metal plate. The first bath is of pure lead and has a temperature of 380° C. The first heating zone has a length of 50 cm. and a temperature of 430° C. It is rinsed with nitrogen to avoid oxidation. In place of the first heating zone, a scraper or an asbestos material may also be used. The resultant Pb layer is about 1 μm. in thickness. The second bath consists of pure tin or SnPb 40. Both variations of the method yielded copper jump wires respectively coated with a Pb layer and an Sn or an SnPb 40 layer, whose average total layer thickness amounted to approximately 8μm. and which possessed excellent solder characteristics, after a 4 day storage at 155° C.

We claim:

1. Method of producing tin or tin alloy layers of a uniform peripheral thickness of >3μ on copper or copper alloy wire by means of hot tin plating, which comprises passing a wire of 0.2 to 1 mm. diameter through a tin bath, and then leading said wire perpendicularly upward through a heating zone of 30 to 100 cm. length with a temperature of 200° to 430° C. Thus obviating the necessity for a scraping die prior to passage to said heating zone.

2. The method of claim 1, wherein the heating zone is rinsed with air or inner gas.

3. The method of claim 1, wherein the wire after passing through the tin bath, runs through a first heating zone, and an air cooling zone of approximately 20° to 50° C. and a length of 100 to 300 cm., the wire then reenters said tin bath, upon leaving the bath, passes through a second heating zone of 200° to 430° C. and an air cooling zone having a temperature of 20° to 50° C. and a length of 100 to 300 cm.

4. The process of claim 1, wherein, the wire, after passing through the tin bath, is scraped free of excess tin and then reenters the tin bath for a second time and after emerging from said bath, passes through a second heating zone and a cooling zone, respectively.

5. The method of claim 1, wherein the wire respectively passes through a first tin bath, thereafter through a first heating zone and a cooling zone, passes through a second tin bath and through a second heating and cooling zone.

6. The method of claim 1, wherein the wire passes through a first tin bath, is scraped free of excess tin, passes through a second tin bath and subsequently through a second heating zone and a cooling zone.

7. The method of claim 5 wherein the first bath is selected from the group consisting of pure tin, pure lead and SnPb alloy and the second bath is comprised of an SnPb alloy, whose melting temperature is lower than that of the first bath.

8. The method of claim 6 wherein the first bath is selected from the group consisting of pure tin, pure lead and SnPb alloy and the second bath is comprise of an SnPb alloy, whose melting temperature is lower than that of the first bath.

9. The method of claim 8, wherein the first bath is a lead bath with an addition of at least one of bismuth, zinc or cadmium.

* * * * *